United States Patent [19]

Reynolds et al.

[11] Patent Number: 5,269,906
[45] Date of Patent: * Dec. 14, 1993

[54] PROCESS FOR THE RECOVERY OF OIL FROM WASTE OIL SLUDGES

[76] Inventors: Victor R. Reynolds, Tobacco Rd., Compton, Md. 20627; Steven R. Heuer, 6864 Welch Ct., Arvada, Colo. 80004

[*] Notice: The portion of the term of this patent subsequent to Feb. 5, 2008 has been disclaimed.

[21] Appl. No.: 612,000

[22] Filed: Nov. 13, 1990

Related U.S. Application Data

[63] Continuation-in-part of Ser. No. 313,240, Feb. 21, 1989, Pat. No. 4,990,237, which is a continuation-in-part of Ser. No. 77,888, Jul. 27, 1987, abandoned.

[51] Int. Cl.$^5$ ............................................. C10G 17/00
[52] U.S. Cl. ........................................ 208/13; 208/179; 208/186; 210/770; 210/774; 210/787; 210/806
[58] Field of Search ........................... 208/13, 179, 186; 210/770, 774, 806, 787

[56] References Cited

U.S. PATENT DOCUMENTS

| | | | |
|---|---|---|---|
| 1,872,963 | 8/1932 | Jones | 208/13 |
| 1,951,739 | 3/1934 | Rodman et al. | 196/16 |
| 3,692,668 | 9/1972 | McCoy | 210/18 |
| 3,693,951 | 9/1972 | Lawhon et al. | 263/8 R |
| 3,696,021 | 10/1972 | Cole et al. | 208/13 |
| 3,923,644 | 12/1975 | Hindman | 208/186 |
| 3,954,602 | 5/1976 | Troesch et al. | 208/174 |
| 4,014,780 | 3/1977 | McCoy | 208/13 |
| 4,033,859 | 7/1977 | Davidson et al. | 208/174 |
| 4,097,378 | 6/1978 | St. Clair | 208/67 |
| 4,139,462 | 2/1979 | Sample, Jr. | 210/73 |
| 4,208,285 | 6/1980 | Sample, Jr. | 210/180 |
| 4,392,941 | 7/1983 | Roth et al. | 210/723 |
| 4,411,074 | 10/1983 | Daly | 34/32 |
| 4,422,940 | 12/1983 | Cousino et al. | 210/771 |
| 4,512,878 | 4/1985 | Reid et al. | 208/179 |
| 4,606,283 | 8/1986 | Desormeaux et al. | 110/250 |
| 4,681,664 | 7/1987 | Budny | 208/185 |
| 4,683,963 | 8/1987 | Skinner | 175/66 |
| 4,726,301 | 2/1988 | Desormeaux et al. | 110/250 |
| 4,738,206 | 4/1988 | Noland | 110/346 |
| 4,742,623 | 5/1988 | Meurer et al. | 34/15 |
| 4,812,225 | 3/1989 | Corti et al. | 208/13 |
| 4,839,022 | 6/1989 | Skinner | 208/13 |
| 4,869,810 | 9/1989 | Ellingson | 208/407 |
| 4,985,131 | 1/1991 | Lane | 208/13 |
| 4,990,237 | 2/1991 | Heuer et al | 208/13 |
| 4,990,265 | 2/1991 | Tenthoff | 208/13 |

OTHER PUBLICATIONS

API Interim Report, "Evaluation of Treatment Technologies for Listed Petroleum Refinery Wastes", Jun. 1987.

Primary Examiner—Helane Myers
Attorney, Agent, or Firm—R. Jonathan Peters

[57] ABSTRACT

Commercially valuable oil is recovered from refinery-produced, Resource Conservation and Recovery Act classified, hazardous waste oil sludges by a series of volatilizing and condensing steps (which may vary depending on the oil, water, and solids content of the sludge) resulting in the production of nonhazardous water and solid waste byproducts. A pumpable, low viscosity, high oil- and/or water-content sludge is first centrifuged to separate free oil and water. If the waste sludges are acidic or if nickel is present in the sludges in sufficient quantities so as to result in unacceptable levels in the TCLP leach filtrate, a base (such as calcium oxide) is admixed with the thick waste oil sludge, centrifuge solids, or other sludges low in oil and/or water content to render the sludges basic. The basic, admixed sludges are heated to volatilize the contained water and oil. Dry, friable, deoiled solids are recycled with the oily sludge feed to prevent material agglomeration and heat exchanger fouling. Oil and water vapor from the high-temperature volatilization apparatus is recycled as an indirect heat source to the low-temperature volatilization apparatus. The volatilized oil and water are condensed and combined with the oil and water centrate, and the oil and water are essentially separated as by gravity. The oil is separated from any entrained water and solids. The nearly oil free, nonhazardous waste water and nonhazardous, deoiled solids can be disposed of in a conventional manner, and the commercially valuable recovered oil is suitable for further refinery processing.

37 Claims, 2 Drawing Sheets

PROCESS FOR THE RECOVERY OF OIL FROM WASTE OIL SLUDGES

This application is a continuation-in-part application of Ser. No. 07/313,240 filed on Feb. 21, 1989 now U.S. Pat. No. 4,990,237; which is a continuation-in-part application of Ser. No. 07/077,888 filed on Jul. 27, 1987 and now abandoned.

FIELD OF THE INVENTION

This invention relates to the treatment of waste oil sludges (classified as hazardous by the Resource Conservation and Recovery Act of 1976) for the recovery of valuable oil products. In its more specific aspect, this invention relates to the treatment of hazardous waste oil sludges containing substantial amounts of solids and/or water for the recovery of valuable oil products which can be utilized as refinery feed stock, or otherwise refined, while producing nonhazardous aqueous and solid waste byproducts.

BACKGROUND AND PRIOR ART

For many years, waste materials such as hazardous waste oil sludges from petroleum refineries were impounded in basins with little thought to their final disposition. These waste sludges occur as American Petroleum Institute (API) and Dissolved Air Flotation (DAF) separator bottoms, tank bottoms, spills, heat exchanger sludge, secondary emulsions, slop oil, and the like. Such waste materials have been classified by the Environmental Protection Agency as hazardous wastes, which therefore restricts their removal from the generation site for treatment and/or disposal. (See for example, Industry and EPA hazardous waste Nos. K048-K052, 40 CFR, Section 261.32, 1985). It is presently acceptable to land farm the wastes using especially developed strains of bacteria for decomposition of the oil. However, the heavy metal contents of the oil left behind in the soil presents potential groundwater and controlled run off contamination to the environment. Furthermore, the oil contained in the sludge is not recovered for reuse or recycling. Presently, some refineries recycle the waste and sludges to delayed cokers. However, the addition of the waste and sludges to the coke is deleterious to coke quality and lowers the value of the coke to a lower-priced fuel coke.

There is a need for the treatment of such hazardous waste materials with a high solids content which is capable of recovering the oil for reuse, such as a high-grade refinery feed, while producing nonhazardous waste materials suitable for conventional and safe disposal.

In U.S. Pat. No. 3,791,965 to Fitzsimons et al, the process disclosed is specific to re-refining of used petroleum products and not to waste sludges. The petroleum products treated by the Fitzsimons et al include crank case oil and transmission fluid collected at service stations and used cutting oils, rolling mill oils, and petroleum based cleaning solvents. The process is only capable of handling a raw feed stock of used liquid petroleum products with a viscosity ranging between that of mineral spirits to about SAE 60 weight oil, which is the method used for determining the viscosity of essentially solids-free liquids. The process handles only solids of small particle size and therefore, solids in excess 100 mesh (105 microns) must be removed prior to treating the feed stock.

The process disclosed in U.S. Pat. No. 3,923,643 to Lewis et al is intended for the exclusive purpose of the purification of used hydrocarbon lubricating oil, and is directed to the removal of suspended lead and other dispersed solids from used lubricating oil. As in Fitzsimons et al, this process is not capable of handling feed stocks containing more than minute amounts of solids or of producing nonhazardous waste by-products.

Additional prior art disclosing a process for cleaning low-solids-containing waste oil include U.S. Pat. No. 3,954,602 to Troesch et al. The process is specific to volatilizing the light oils and water only, and the organic solids residue removed by filtration from the remaining heavy oil is combusted for reheating oil treated in the process leaving no unburned matter. Other similar prior art for treatment of low solids waste oil include such patents as U.S. Pat. No. 4,512,878 to Reid et al for reclaiming used lubricating oils for reuse and U.S. Pat. No. 1,951,739 to C. J. Rodman et al for treating mineral hydrocarbon oil, especially those used in electrical apparatus.

This invention has as its purpose to provide for the treatment of hazardous waste oil sludge, which has essentially no upper limitation in solids content and with the solids particle size ranging from submicron to several inches (i.e. up to about six inches). Coarser materials can be treated by the process of this invention after size reduction by any suitable means such as grinding, crushing, pug mills, disintegrators, etc. The oil recovered is essentially the equivalent of cracker or cutter oil feed stock (based on the carbon chain contents, boiling point ranges, flash points, sulfur contents, etc.) and is suitable for further refining as in a cracking unit or as cutter oil feed stock. The water-free and oil-free solids are nonhazardous when tested in accordance with EPA toxicity test procedures, and therefore are suitable for disposal in a conventional sanitary landfill. Also, the waste water generated by the process of this invention is nonhazardous and therefore can be further treated in a conventional refinery water treatment system.

SUMMARY OF THE INVENTION

In accordance with this invention, oil is recovered from hazardous waste oil sludge material by a series of volatilizing and condensing steps, which may vary depending on the content of the sludge. The waste materials treated in this invention typically may have a substantial oil residue content which is valuable and worth recovering, but the waste also has a high solids and/or water content which renders known recovery processes extremely difficult and/or impractical. As used herein and in the appended claims, waste oil or waste oil sludge includes the typically impounded, highly emulsified refinery sludges as well as continuously generated API and DAF bottoms, spills, heat exchanger sludge, secondary emulsions, slop oil, and the like. The weight percent solids in the waste oil sludge typically ranges from 5 to 65%, but can approach 80 to 90% in certain situations. Because the waste oil sludges frequently contain substantial amounts of water and/or oil (typically 40-80%) as well as solids, these high-oil and/or high-water containing sludges, if sufficiently fluid, are first centrifuged or otherwise treated as by filtration, gravity, or the like to separate the free oil and water from the solids. The high-solids fraction from the separating step, e.g. centrifuge, still containing substantial amounts of oil and water, and therefore still hazardous materials as defined by the United States EPA, are then subjected to a series of volatilizing and condensing steps to recover the valuable oil fraction and produce nonhazardous water and solid waste by-products.

Fluid, hazardous waste oil sludges not capable of being pre-separated by mechanical means, thick hazardous waste oil sludges, the still hazardous separated solids, and other oily, hazardous sludges low in water and/or oil content which are highly viscous and contain (entrained) oil and water not removable by mechanical means, such as centrifuging, are processed directly in a volatilization stage, preferably multiple stages of volatilizing (with increasing temperature gradients), and condensing unit operation. In the event the waste oil sludge contains nickel, the sludge (which may have an acidic Ph) is neutralized to a basic pH by the addition of alkali material to the sludge prior to the volatilizing step. In accordance with one embodiment of the process, a two-stage volatilization may be useful to better insure the efficient recovery of the oil and water. In the first stage units of the volatilizing (desirably indirectly heated with recycled oil-water vapor from the second stage high-temperature volatilization units) and condensing operation, the temperature and retention time is sufficient to volatilize a major portion of the water and the light end fraction of the oil which is subsequently condensed and separated in the oil water separating apparatus. The remaining, still hazardous oil-water-solids sludge from the first low-temperature volatilization unit, which typically contains the bulk of the oil and solids in the hazardous waste oil sludge feed, is then conveyed to one or more higher temperature volatilizing-condensing unit operations to volatilize and condense the remaining oil and water and produce water-free and oil-free nonhazardous solid waste (when tested in accordance with recognized solvents for oil and grease determinations). In a preferred embodiment, a substantial quantity of the deoiled solids is recycled and mixed with the oily feed to the second stage to prevent sludge baking, agglomeration, and heat exchanger fouling.

The effluent, such as a centrate from a centrifuge, and the oil and water condensate from the volatilization steps are passed to a settler or other suitable apparatus to separate the water from the oil as by gravity. Final removal of entrained water and solids from the oil is accomplished in a second separator, such as a centrifuge, filter, or the like. The dry, deoiled, nonhazardous waste solids are acceptable for meeting the limits for both controlled metals and organic compounds for disposal in a conventional sanitary landfill, and the nonhazardous waste water can be treated by common practices in a refinery water treatment system (or a water treatment system may be incorporated into the described process). The oil recovered by this invention is essentially the equivalent of cracking or cutter oil feed stock and is suitable for further refining in such appropriate apparatus.

The water generated or recovered from the described process may contain, or have entrained, organic hydrocarbons, hydrocarbon constituents, and/or inorganic salts carried over from the final centrifuging operation. The organic content is relatively low, typically 100 ppm or lower. Because of the low organic and/or inorganic salt content, any objectional chemical oxygen demand (COD) present in the waste water can be reduced by conventional means such as trickling filtration. Thus, for water (containing approximately 100 ppm organics) recovered from the process, conventional water treatment can reduce the organics and COD to 10 ppm or lower, which is well below the recognized discharge limit.

BRIEF DESCRIPTION OF THE ACCOMPANYING DRAWING

DETAILED DESCRIPTION OF THE INVENTION

Figure 1:
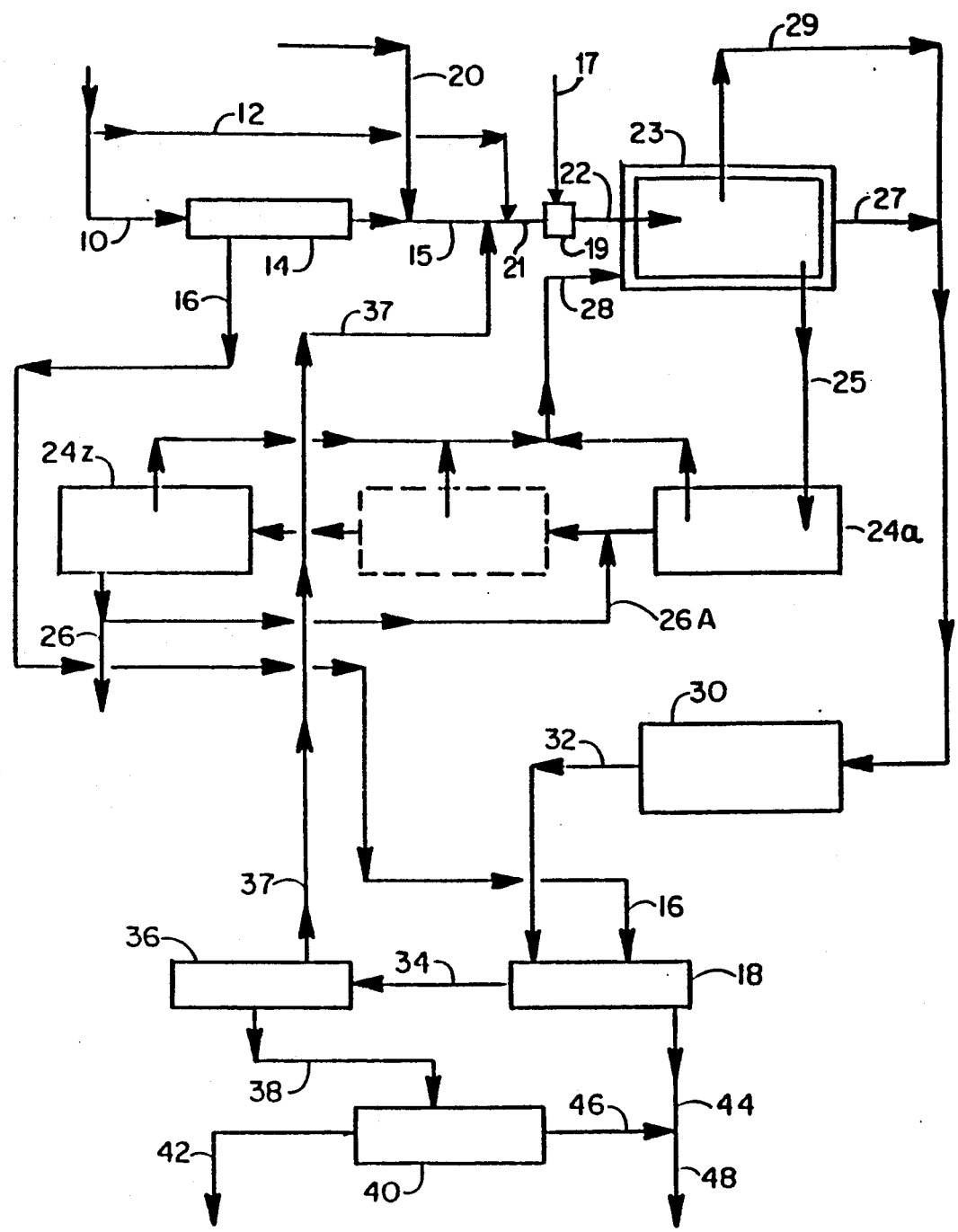
FIG. 1 is a block diagram representing the processing steps of the present invention.

In accordance with one embodiment of the invention, waste oil sludge is dredged or pumped from storage to a surge tank. As illustrated in FIG. 1, fluid, hazardous waste oil sludge (a high water/oil content), which typically may contain about 5 up to 20 weight percent of solids, which contains adequate oil and water so that it can be mechanically separated is pumped via conduit 10 to horizontal centrifuge 14 for separation of any free oil and water. The resulting centrifuge effluent or centrate of oil and water is then discharged through line 16 to settler 18. Fluid, hazardous waste oil sludge which does not contain sufficient free oil and/or free water so that it can be mechanically separated, and wet, oily, still-hazardous solids (i.e. solids with entrained oil and water) discharged from the horizontal centrifuge 14 are pumped through lines 12 and 15, respectively, and combined at line 21 with thick, hazardous waste oil sludge (containing up to 90% solids) mechanically conveyed via line 20. Nickel and 46 controlled organic compounds were recently classified as hazardous by the Federal EPA per Toxicity Characteristic Leaching Procedure (TCLP) and Best Demonstrated Available Technology (BDAT) regulations for refinery wastes (See 40 CFR, Part 268, Subpart D, Jun. 13, 1990. Nickel is sometimes found in waste oil sludges in amounts exceeding the BDAT toxicity leachability limit of 0.2 mg/l. In accordance with the invention, the nickel leachability from the sludge is reduced to below this toxicity limit in order to render the sludge nonhazardous. Thus, prior to the vaporization step in apparatus 23, the waste oil sludge material, which may have an acidic pH ranging from about 2.0 to 6.0, is neutralized and rendered slightly basic, desirably between pH values of 7.0 to 11.0, and more preferably to a pH between 7.5 and 10. A relatively small amount of a base, such as an alkaline metal oxide or hydroxide or alkaline earth metal oxide or hydroxide, is added via line 17 and combined and thoroughly admixed in unit 19 with the sludge from line 21. The amount of base required is relatively small, ranging from about 1.5 to 10 weight percent of the total weight of the sludge material, and depends largely on such factors as acidity of the sludge and strength and concentration of the base. It is desirable that the base used not result in a corrosive, hazardous waste material (deoiled solids), and that the base be of sufficient strength to raise the pH 10 with a relatively low quantity. Lime (calcium oxide) is the preferable base material for this purpose. As illustrated in the examples, this lime treatment results in dry, deoiled solids having nickel leachability substantially below the allowed BDAT toxicity limit. The admixture from unit 21 is passed by line 22 to a low-temperature, oil-water vaporization apparatus 23 (preferably heated with oil-water vapor passed via line 28 from the high-temperature apparatus 24a–24z, described below). The low-temperature volatilization apparatus is operated between about 225° and 400° F. at atmospheric pressure or slight negative pressure. The partially deoiled and dewatered sludge from apparatus 23 is pumped or conveyed via line 25 to high-temperature, oil-water vaporization apparatus 24a-24z arranged in series and operated between about 400° and 1,150° F. at atmospheric pressure or slight negative pressure, preferably between about 675° and 950° F. It should be understood, however, that the temperature for the vaporization units can vary depending on such factors as the source and composition of the hazardous waste oil sludge. The high-temperature volatilization apparatus 24a-24z may comprise one or more units connected in series, and may be, for example, a high-temperature, oil-heated, continuously-fed, mechanical drier or heat transfer piece of equipment, a fluid bed reactor operating under reducing conditions, or other conventional heat exchange kilns or roasters available to the industry. The number of such units depends upon the quality and rate of the oil-containing material being process. The deoiled, non-hazardous solids are discharged via line 26 for disposal in a sanitary landfill or other suitable waste disposal site (not shown). Where required, the deoiled solids may be recirculated or recycled via line 26a to a suitable intake point of apparatus 24a-24z to maintain the material passed through line 25 relatively friable. The oil-water vapor from volatilization apparatus 24a-24z is transferred via line 28 to a heat exchanger of low-temperature apparatus 23 as an indirect heat source, and the oil and water vapor and condensate from all volatilization operations is transferred via lines 27 and 29 to condenser or scrubber 30. The resulting condensate is passed through line 32 to the oil-water settler 18 where the condensate is combined with the oil-water centrate or effluent passed through line 16 from horizontal centrifuge 14. The settler 18 overflow, composed of oil and entrained water and solids carried over from the centrifuge 14 and high-temperature volatilization operations, is pumped via line 34 to separator centrifuge 36 where the weak emulsion, consisting of oil, water, and very fine solids, is easily broken as by mechanical means, de-emulsifying agent, or the like. The hazardous, wet, oily solids from separator centrifuge 36 are returned to low-temperature apparatus 23 via line 37, and the oil and water centrifuge effluent or centrate is discharged through line 38 to settler 40. The oil overflow from settler 40 is sent via line 42 to storage as product for further processing, and the nonhazardous water underflow from settlers 18 and 40 is discharged via lines 44 and 46, respectively, and line 48 to a suitable water treatment facility (not shown), or the like, to reduce any objectionable contained organic content or chemical oxygen demand.

The process of this invention and its advantages will be apparent in the following specific Examples illustrating the preferred embodiments of the process. Samples of several hazardous waste oil sludges for Examples 1-10 were tested to determine oil recovery, recovered oil quality, and waste material characteristics. The oil recovered in the Examples is commercially valuable as cracker or cutter oil feed stock based on such factors as carbon chain contents, boiling point ranges, flash points, and impurity contents determined by laboratory analyses.

EXAMPLE 1

Thick, hazardous, strongly emulsified (naturally occurring or from previous refinery processing) waste oil sludge (130 g) containing 33.6% oil, 56.7% water, and 9.7% solids was placed in a stainless steel boat and inserted in an electrically heated tube furnace fitted with a reflux condenser and graduated collection cylinder. The sample was initially heated at atmospheric pressure to 400° F. to volatilize the water and finally to 700° F. to volatilize the oil. The steam and oil vapor were purged from the tube furnace by applying a slight vacuum to the discharge side of the condenser.

The condensate consisted of 70 g of water and 42 g of oil for a recovery of 96%. The condensed water and the solid residue (10 g) were subjected to EP toxicity tests, and the results were as follows:

| | mg/l | | | |
|---|---|---|---|---|
| Constituent | Before Treatment | EP Tox Limit | Waste Solids | Condensed Water |
| Ag | 0.24 | 5.0 | 0.13 | 0.02 |
| Pb | 6.1 | 5.0 | 0.30 | 0.62 |
| Cd | 0.03 | 1.0 | 0.02 | 0.11 |
| Cr | 1.2 | 5.0 | 0.09 | 0.23 |
| Ba | 3.6 | 100.0 | 1.1 | 2.9 |
| As | 2.8 | 5.0 | 0.07 | 0.18 |
| Se | 0.06 | 1.0 | 0.05 | 0.11 |
| Hg | 0.002 | 0.2 | 0.002 | 0.002 |

Both the waste solids and condensed water were shown to be nonhazardous by EPA leachability test standards. This feature is extremely significant for a process of this type, because the solids can be disposed of in a sanitary landfill, and the water can be easily handled in a conventional water treatment system.

EXAMPLE 2

Thick, hazardous strongly emulsified (naturally emulsified or from previous refinery processing) waste oil sludge (150 g) containing 37.2% oil, 52.5% water, and 10.3% solids was processed in equipment described in Example 1.

The condensate consisted of 75 g of water and 55 g of oil for a recovery of 98.5%. The condensed water and the solid residue (12 g) were subjected to EP toxicity tests, and the results showed both wastes to be nonhazardous.

| | mg/l | | |
|---|---|---|---|
| Constituent | EP Toxic Limit | Waste Solids | Condensed Water |
| Ag | 5.0 | 0.05 | 0.02 |
| Pb | 5.0 | 0.30 | 0.54 |
| Cd | 1.0 | 0.02 | 0.16 |
| Cr | 5.0 | 0.16 | 0.31 |
| Ba | 100.0 | 1.1 | 3.2 |
| As | 5.0 | 0.11 | 0.14 |
| Se | 1.0 | 0.04 | 0.18 |
| Hg | 0.2 | 0.003 | 0.001 |

EXAMPLE 3

Fluid, hazardous waste oil sludge (300 g) containing 21.1% oil, 73.5% water, and 5.4% solids was centrifuged in a batch laboratory centrifuge, and the separated oil (38 g) and water (110 g) were decanted from the centrifuge tubes. The thick, strongly emulsified, oily, wet, still hazardous solids from the centrifuge were processed in the equipment described in Example 1.

The condensed water (100 g) and oil (35 g) resulted in a total recovery of 99.5%. The combined centrifuge and condensed water and the solid residue (17 g) were subjected to EP toxicity testing, and the results showed both the waste water and the solids to be nonhazardous.

| Constituent | EP Toxic Limit | mg/l Waste Solids | Condensed Water |
|---|---|---|---|
| Ag | 5.0 | 0.05 | 0.09 |
| Pb | .5.0 | 0.38 | 1.46 |
| Cd | 1.0 | 0.04 | 0.41 |
| Cr | 5.0 | 0.04 | 1.13 |
| Ba | 100.0 | 1.2 | 4.6 |
| As | 5.0 | 0.02 | 0.67 |
| Se | 1.0 | 0.03 | 0.30 |
| Hg | 0.2 | 0.002 | 0.005 |

EXAMPLE 4

Fluid, hazardous waste oil sludge (16,908 g) containing 24.7% oil, 68.4% water, and 4.8% solids (and unknown uncombustibles) was continuously processed in a 4-inch-diameter, electrically heated (700° F.) fluid bed reactor using a fluidizing gas consisting of 79% nitrogen, 20% carbon dioxide, and 1% oxygen preheated to approximately 700° F. The vaporized water and oil were continuously condensed and collected in a recirculating packed-tower water scrubber. Prior to quenching in the water scrubber, the solids were removed from the gases leaving the fluid bed via a dry cyclone.

The condensed oil (4,110 g) resulted in 98.4% recovery of the oil. The scrubber water and the waste solids (890 g) were subjected to EP toxicity tests, and the results showed both the water and the solids to be nonhazardous.

| Constituent | EP Toxic Limit | mg/l Waste Solids | Condensed Water |
|---|---|---|---|
| Ag | 5.0 | 0.5 | 0.005 |
| Pb | 5.0 | 0.31 | 0.08 |
| Cd | 1.0 | 0.02 | 0.06 |
| Cr | 5.0 | 0.11 | 0.07 |
| Ba | 100.0 | 2.37 | 0.06 |
| As | 5.0 | 0.02 | 0.03 |
| Se | 1.0 | 0.07 | 0.04 |
| Hg | 0.2 | 0.002 | Nil |

EXAMPLE 5

Figure 2:
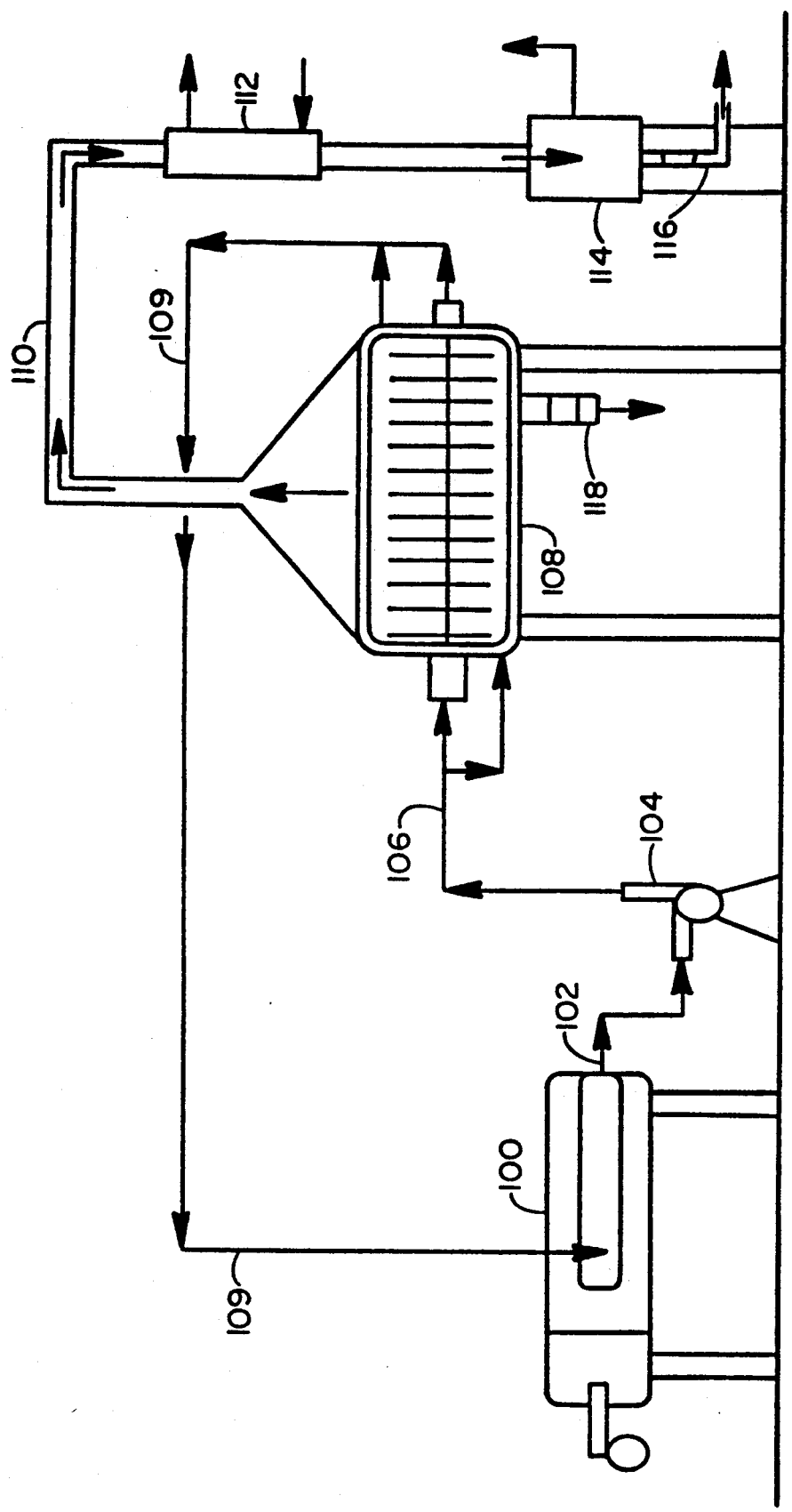
FIG. 2 is a diagrammatic representation of a preferred embodiment of the invention.

Thick, hazardous waste oil sludge (163 lb.) containing 20.0% oil, 28.3% water, and 49.1% solids (and unknown uncombustibles) was processed in the equipment shown in FIG. 2. Heat transfer fluid is heated in oil heater 100° to 500° F. to volatilize the water and then to 750° F. to volatilize the oil. The heat transfer fluid was circulated via line 102, pump 104 and line 106 through the hot oil sludge processor 108, maintained at about 500° and 750° F. while the material was mechanically agitated with slowly rotating paddles in the processor. A return for the heat transfer fluid is provided via line 109. The oil-water vapor was then passed through line 110 where it was condensed in condenser 112, and collected in vessel 114.

The condensed oil (30 lb.) and water collected from line 116 resulted in 92.1% recovery of the oil, but the solid material 35 taken at line 118 baked into hard chunks restricting more complete volatilization. A blower at 119 releases the gases by providing a slight negative pressure to purge the oil and water vapor through the recovery system. The condensed water (45 lb.) and the waste solids (83 lb.) still containing 3.1% oil were subjected to EP toxicity tests, and the results showed the water and solids to be nonhazardous.

| Constituent | Before Treatment | EP Tox Limit | mg/l Waste Solids | Condensed Water |
|---|---|---|---|---|
| Ag | 0.02 | 5.0 | 0.01 | 0.001 |
| Pb | 10.3 | 5.0 | 2.41 | 0.02 |
| Cd | 0.03 | 1.0 | 0.02 | 0.006 |
| Cr | 4.6 | 5.0 | 0.03 | 0.01 |
| Ba | 2.1 | 100.0 | 0.71 | 0.04 |
| As | 0.4 | 5.0 | 0.01 | 0.001 |
| Se | 0.04 | 1.0 | 0.001 | 0.001 |
| Hg | 0.001 | 0.2 | 0.0001 | 0.0001 |

To prevent the sludge baking, agglomeration, and the heat exchanger surface from fouling as experienced in Example 5, 90 lb. of thick oil sludge as used in Example 5 was mixed in the hot oil sludge processor with recycled, ground, dry, friable waste solids taken from line 118 (FIG. 2) of Example 5 and 30 lb. of sand as previously described in Example 5. The sand was added to increase the solids ratio and to facilitate startup. However, the sand addition and amount was optional.

Thick, hazardous waste oil sludge (90 lb.) containing 20.0% oil, 28.3% water, and 49.1% solids was mixed with dry, friable solids (60 lb.) containing 3.1% oil from Example 5 and sand (30 lb.) in the hot oil processor as previously describe in Example 5. Heat transfer fluid (first heated to 600° F. to volatilize the water and 750° F. to volatilize the oil) was circulated through the hot oil processor while the material was slowly mechanically agitated. The condensed oil (19 lb.) resulted in 95.5% recovery of the oil. The condensed water (25 lb.) and fluffy, friable waste solids (133 lb.) were subjected to EP Toxicity tests, and the results showed both the water and solids to be nonhazardous.

| Constituent | Before Treatment | EP Tox Limit | mg/l Waste Solids | Condensed Water |
|---|---|---|---|---|
| Ag | 0.02 | 5.0 | 0.01 | 0.001 |
| Pb | 10.3 | 5.0 | 3.25 | 0.02 |
| Cd | 0.03 | 1.0 | 0.01 | 0.005 |
| Cr | 4.6 | 5.0 | 0.01 | 0.01 |
| Ba | 2.1 | 100.0 | 0.59 | 0.06 |
| As | 0.4 | 5.0 | 0.001 | 0.001 |
| Se | 0.04 | 1.0 | 0.001 | 0.001 |
| Hg | 0.001 | 0.2 | 0.001 | 0.001 |

In the following Examples 7-10, sample charges were taken from a waste sludge pit in Tulsa, Okla. which had been abandoned since about 1949.

EXAMPLE 7

Thick, hazardous, strongly emulsified (emulsified naturally or from previous refinery processing) waste oil sludge containing approximately 27% oil, 68% water, and 5% solids was processed in an electrically heated retort fitted with a reflux condenser and graduated cylinder. The 658 g sample was initially heated at atmospheric pressure to 400° F. to volatilize the water and finally to 700° F. to volatilize the oil. The condensate consisted of 450 g of water and 115 g of oil. Approximately 60 g of uncondensed gas (determined by difference between the charge weight and the total of condensed water and oil and residual solids [33 g] weights) was combusted at the discharge end of the condenser. The condensed oil and uncondensed combusted gas resulted in 98% volatilization of the contained organic material.

EXAMPLE 8

The procedure of Example 7 was followed except that the hazardous waste oil sludge charge was 754 g, and contained approximately 18% oil, 29% water, and 53% solids. The processing products consisted of 218 g of water, 117 g of oil, approximately 17 g of uncondensed combusted gas, and 402 g of dry friable solids. The condensed oil and uncondensed combusted gas resulted in 98.5% volatilization of the contained organic material.

EXAMPLE 9

The procedure of Example 7 was followed except that the hazardous waste oil sludge charge was 417 g, and contained approximately 43% oil, 30% water, and 27% solids. The processing products consisted of 128 g of water, 100 g of oil, approximately 76 g of uncondensed combusted gas, and 113 g of dry friable solids. The condensed oil and uncondensed combusted gas resulted in 98.3% volatilization of the contained organic material.

EXAMPLE 10

Thick, hazardous, strongly emulsified (emulsified naturally or from previous refinery processing) waste oil sludge containing approximately 27% oil, 68% water, and 5% solids was processed in an electrically heated retort fitted with a reflux condenser and graduated collection cylinder. The 643 g sample was initially heated at atmospheric pressure to 400° F. to volatilize the water and finally to 700° F. to volatilize the oil. The condensate consisted of 400 g of water and 112 g of oil. Approximately 59 g of uncondensed gas (determined by the difference between the charge weight and the total of the condensed water and oil and residual solids [32] weights) was combusted at the discharge end of the condenser. The condensed oil and uncondensed combusted gas resulted in 98% volatilization of the contained organic material. The somewhat sticky solids from the 700° F. volatilization step were gradually heated to 1100° F. where volatilization ceased and an additional 4 g of waxy material was volatilized and condensed resulting in an additional 2% recovery of the organic material and a final dry, friable solids weight of 28 g.

An admixture of the solids and water recovered in the Examples 7–10 was tested for EP toxicity, and the results showed both the solids and water to be nonhazardous.

| Constituent | mg/l | | |
|---|---|---|---|
| | EP Toxic Limit | Waste Solids | Condensed Water |
| Ag | 5.0 | 0.01 | 0.001 |
| Pb | 5.0 | 0.6 | 0.03 |
| Cd | 1.0 | 0.02 | 0.002 |
| Cr | 5.0 | 0.06 | 0.03 |
| Ba | 100.0 | 0.11 | 0.07 |
| As | 5.0 | 0.09 | 0.01 |
| Se | 1.0 | 0.02 | 0.001 |
| Hg | 0.2 | 0.02 | 0.002 |

EXAMPLE 11

Thick, hazardous, strongly emulsified waste oil sludge (having a pH in water of 3.5) containing approximately by weight 53% oil, 27% water, and 20% solids was processed in an electrically-heated retort fitted with a reflux condenser and graduated collection cylinder. A 200 g sample of the sludge was initially heated at atmospheric pressure to 400° F. to volatilize the water and light oils and finally to 800° F. to volatilize the higher boiling point oil. The condensate consisted of 55 g of water and 95 g of oil. Approximately 10 g of uncondensed gas (determined by the difference between the charge weight and the total weight of the condensed water, oil, and residual solids [40 g]) was combusted at the discharge end of the condenser. The condensed oil and uncondensed gas resulted in 99% volalilization of the contained organic material. The condensed water and dry, deoiled, friable solids were subjected to TCLP leaching tests, and the results are shown in the following data.

| Constituent | mg/l | | | |
|---|---|---|---|---|
| | Before Treatment | TCLP Tox Limit | Waste Solids | Conden. Water |
| Ag | 0.01 | 5.0 | 0.01 | 0.001 |
| Pb | 7.2 | 5.0 | 1.41 | 0.01 |
| Cd | 0.08 | 1.0 | 0.01 | 0.005 |
| Cr | 2.45 | 5.0 | 0.09 | 0.01 |
| Ba | 6.2 | 100.0 | 0.12 | 0.21 |
| As | 0.34 | 5.0 | 0.05 | 0.01 |
| Se | 0.06 | 1.0 | 0.04 | 0.001 |
| Hg | 0.02 | 0.2 | 0.02 | 0.001 |
| Ni | 0.68 | 0.2 | 0.49 | 0.01 |

The data showed that the nickel (added to the Best Demonstrated Available Technology [BDAT] hazardous metals lists for refinery wastes in 1990) in the TCLP leach filtrate exceeded the solubility limit by a factor of two.

Lime was added to an identical sample of the waste oil sludge to neutralized the sludge to pH 8.5 (2% by weight CaO addition to the sludge) prior to the volatilization of the water and oil. Subjecting the dry, deoiled solids to the TCLP leaching procedure resulted in a filtrate passing the TCLP and BDAT tests for controlled metals, including the nickel which was reduced to 0.014 mg/l.

In addition to the leaching test for metals, other extraction tests for controlled organic compounds showed the waste solids passed all TCLP and BDAT organic-content criteria. The complete controlled organic list included the following compounds. Allowable limits (mg/l) are shown in parentheses.

| TCLP | BDAT |
|---|---|
| Benzene (0.5) | Anthracene (28) |
| Carbon tetrachloride (0.5) | Benzo (a) pyrene (12) |
| Chlordane (0.03) | Bis(1-ethylhexyl) |
| Chlorobenzene (100) | phthalate (7.3) |
| Chloroform (6) | Chrysene (15) |
| O-Cresol (200) | Di-n-butyl phthalate |
| M-Cresol (200) | (3.6) |
| P-Cresol (200) | Ethylbenzene (14) |
| 1,4-Dichlorobenzene (7.5) | Naphthalene (42) |
| 1,2-Dichloroethane (0.5) | Phenanthrene (34) |
| 1,1-Dichloroethylene (0.7) | Phenol (3.6) |
| 2,4-Dinitrotoluene (0.13) | Pyrene (36) |
| Heptachlor (0.008) | Toluene (14) |
| Hexachlorobenzene (0.13) | Xylene (22) |
| Hexachloro-1,3-butadiene (0.5) | Benzene (14) |
| | O-Cresol (6.2) |
| Hexachloroethane (3) | P-Cresol (6.2) |
| Methyl ethyl ketone (200) | |
| Nitrobenzene (2) | |
| Pentachlorophenol (100) | |
| Pyridine (5) | |
| Tetrachloroethylene (0.7) | |
| Trichloroethylene (0.5) | |
| 2,4,5-Trichlorophenol (400) | |
| 2,4,6-Trichlorophenol (2) | |
| Vinyl chloride (0.2) | |
| Endrin (0.02) | |
| Lindane (0.4) | |
| Methoxychlor (10) | |
| Toxaphene (0.5) | |
| 2,4-D (10) | |
| 2,4,5-TP (silvex) (1) | |

EXAMPLE 12

Thick, hazardous, strongly emulsified waste oil sludge (having a pH in water of 4.1) containing approximately 42% oil, 15% water, and 43% solids was processed in an electrically-heated retort fitted with a reflux condenser and graduated collection cylinder. A 200 g sample of sludge was initially heated at atmospheric pressure to 400° F. to volatilize the water and light oils and finally to 800° F. to volatilize the higher boiling point oil. The condensate consisted of 30 g of water and 75 g of oil. Approximately 8 g of uncondensed gas (determined by the difference between the charge weight and the total weight of the condensed water, oil, and residual solids [87 g]) was combusted at the discharge end of the condenser. The condensed oil and uncondensed gas resulted in 99% volatilization of the contained organic material. The condensed water and dry, deoiled, friable solids were subjected to TCLP leaching tests, and the results are shown in the following data.

| | mg/l | | | |
|---|---|---|---|---|
| Constituent | Before Treatment | TCLP Tox Limit | Waste Solids | Conden. Water |
| Ag | 0.02 | 5.0 | 0.20 | 0.001 |
| Pb | 0.6 | 5.0 | 0.03 | 0.01 |
| Cd | 0.05 | 1.0 | 0.01 | 0.003 |
| Cr | 3.39 | 5.0 | 0.01 | 0.01 |
| Ba | 3.18 | 100.0 | 0.65 | 0.11 |
| As | 0.31 | 5.0 | 0.04 | 0.01 |
| Se | 0.09 | 1.0 | 0.07 | 0.002 |
| Hg | 0.006 | 0.2 | 0.02 | 0.001 |
| Ni | 0.87 | 0.2 | 0.48 | 0.03 |

The data showed that the nickel in the TCLP leach filtrate exceeded the solubility limit by a factor of greater than two.

An identical sample of the waste oil sludge was neutralized to pH 8.5 with lime (1.5% CaO addition by weight) prior to the volatilization steps. Subjecting the dry, deoiled solids to the TCLP leaching procedure resulted in a filtrate passing all the TCLP and BDAT controlled metals, including the nickel which was reduced to 0.019 mg/l.

In addition to the leaching test for metals, other extraction tests for controlled organic compounds showed the waste solids passed all TCLP and BDAT organic-content criteria as previously listed in Example 11.

What is claimed is:

1. A process for the recovery of oil, useful for further processing as refinery feed stock, from waste oil sludge containing oil, water and at least 5% by weight solids, and from which the oil and water cannot be separated by mechanical means, comprising:

(a) heating by indirect heat exchange said sludge at a temperature sufficient to volatilize the oil and water in said sludge, and recovering solids free of oil and water, said solids being classified nonhazardous by EPA toxicity test procedure, (b) condensing said oil and water, (c) separating oil from water and any entrained solids from the condensate of step (b), (d) recovering the oil from step (c) as a valuable oil product, and (e) recovering the water from step (c) whereby said water is sufficiently clean for further treatment in a conventional water treatment facility to lower the Chemical Oxygen Demand to an acceptable limit.

2. A process for the recovery of oil, useful for further processing as refinery feed stock, from two or more waste oil sludges containing oil, water, and solids, at least one said sludge being fluid waste oil sludge and the other sludge being a thick waste oil sludge, comprising:

(a) treating said sludge to substantially separate free oil and free water from the solids, (b) heating by indirecting heat exchange solids having entrained oil and water from the treatment step in (a) at a temperature sufficient to volatilize all entrained oil and water, and recovering solids, said solids being classified nonhazardous by EP toxicity test procedure, (c) condensing said oil and water from step (b), (d) treating the resulting condensate from step (c) and free oil and water from step (a) to separate oil from water and any entrained solids, (e) recovering oil from step (d), and (f) recovering water from step (d), whereby said water is sufficiently clean for further treatment in a conventional water treatment facility to lower the Chemical Oxygen Demand to an acceptable limit.

3. A process for the recovery of oil, useful for further processing as refinery feed stock, from two or more waste oil sludges containing oil, water, and solids, at least one said sludge being fluid waste oil sludge and the other sludge being a thick waste oil sludge, comprising:

(a) treating said fluid sludge to substantially separate free oil and free water from solids and recovering the oil and water, (b) heating by indirect heat exchange said thick sludge and the resulting solids from step (a) containing oil and water at a temperature sufficient to volatilize oil and water, said resultant solids being classified nonhazardous by EPA toxicity test procedure;

(c) condensing the oil and water from step (b) and recovering the condensate, (d) treating the free oil and water from step (a) and the condensate from step (c) to separate the oil from water and any entrainded solids, and (e) recovering oil from step (d).

4. A process according to claims 1, 2, or 3 wherein said heating step is conducted at a first temperature of from about 225° to 400° F. to volatilize oil and water leaving a partially dewatered and deoiled sludge, and then conducted at a second temperature of from about 400° to 1150° F. thereby resulting in solids free of oil and water, said solids being classified nonhazardous by EPA toxicity test procedure.

5. A process according to claim 4 wherein prior to said heating step, a base in sufficient quantity is admixed with the waste oil sludge to render the pH basic.

6. A process according to claim 5 wherein the resulting pH ranges from at least about neutral to about 11.

7. A process according to claim 5 wherein the resulting pH is from about 7.5 to 10.

8. A process according to claim 5 wherein said base is calcium oxide.

9. A process according to claim 5 wherein said separating steps are centrifuging, said base is calcium oxide, and said pH is from about 7.5 to 10.

10. A process according to any of claims 1, 2, or 3 wherein prior to said heating step, a base in sufficient quantity is admixed with the waste oil sludge to render the pH basic.

11. A process according to claim 10 wherein the resulting pH ranges from at least about neutral to about 11.

12. A process according to claim 10 wherein the resulting pH is from about 7.5 to 10.

13. A process according to claim 10 wherein said base is calcium oxide.

14. A process according to claim 10 wherein said separating steps are centrifuging, said base is calcium oxide, and said pH is from about 7.5 to 10.

15. A process for the recovery of oil, useful for further processing as refinery feed stock, from waste oil sludge containing oil, solids, and a substantial amount of water, comprising:

(a) treating said sludge to substantially separate free oil and free water from the solids, (b) passing the oil and water from step (a) to a (settler) separator means, (c) heating by indirect heact exchange the solids from step (a) at a temperature
sufficient to volatilize entrained oil and water, said resulting solids being classified nonhazardous by EPA toxicity test procedure (d) condensing said oil and water from step (c) and passing the condensate to said (settler) separator means of step (b), (e) collecting the resulting (settler) separator overflow and separating oil from water and any entrained solids, and (f) recovering oil from step (e).

16. A process according to claim 15 wherein said volatilization is conducted at a temperature of from about 225° to 1150° F.

17. A process according to any of claims 1, 2, 3, 15, or 16 wherein at least a portion of the solids recovered from the heating step, which are free of oil and water, are recycled to said heating step.

18. A process according to claim 4 wherein at least a portion of the solids recovered from the heating step at said second temperature, which are free of oil and water, are recycled to said second high-temperature heating step.

19. A process for the recovery of oil, useful for further processing as refinery feed stock, from waste oil sludge containing oil, solids, and a substantial amount of water, comprising:

(a) treating said sludge to substantially separate free oil and free water from the remaining sludge, (b) admixing the resulting sludge from the treatment step (a) with a base in sufficient quantity to render the sludge pH at least about neutral to basic and heating by indirect exchange product the resulting admixture at a temperature sufficient to volatilize entrained oil and water and leaving partially dewatered and deoiled sludge, (c) heating by indirect heat exchange the resulting sludge from step (b) at a higher temperature than in step (b) to further volatilize oil and water from said sludge, thereby resulting in solids free of oil and water, said solids being classified nonhazardous by EPA toxicity test procedure, (d) condensing said oil and water from both steps (b) and (c), (e) treating the resulting condensates from step (d) and said oil and water from step (a) to separate oil from water and any entrained solids, and (f) recovering oil from said treating of step (e).

20. A process according to claim 19 wherein said first volatilization is conducted at a temperature of from about 225° F. to 400° F., and said second volatilization is conducted at a temperature of from 400° to 1150° F.

21. A process according to claim 19 wherein at least a portion of the oil-water vapor from step (c) is recirculated into an indirect heat transfer relationship with the sludge of step (a) as a heat source for step (b).

22. A process according to claims 19, 20, or 21 wherein the resulting pH ranges from at least about neutral to about 11.

23. A process according to claim 22 wherein the resulting pH is from about 7.5 to 10.

24. A process according to claim 22 wherein said base is calcium oxide.

25. A process according to claim 22 wherein at least a portion of the solids recovered from the heating step, which are free of oil and water, are recycled to said heating step.

26. A process according to claim 25 wherein the weight percent of recycled, deoiled solids in the admixture is from about 30 to 65%.

27. A process according to claim 22 wherein said higher temperature heating in step (c) is carried out in two or more stages operated in series.

28. A process according to claim 22 wherein the water is recovered separately from said oil in step (e), said water being sufficiently clean for further treatment in a conventional water treatment facility to lower the Chemical Oxygen Demand to an acceptable limit.

29. A process for the recovery of oil, useful for further processing as refinery feed stock, from waste oil sludge containing oil, solids, and a substantial amount of water, comprising:

(a) treating said sludge with a base in sufficient quantity to render the sludge pH at least about neutral to basic and heating the resulting admixture at a temperature sufficient to volatilize entrained oil and water and leaving partially dewatered and deoiled sludge, (b) heating by indirect exchange product the resulting sludge from step (a) at a higher temperature than in step (a) to further volatilize oil and water from said sludge, thereby resulting in solids free of oil and water, said solids being classified nonhazardous by EPA toxicity test procedure, (c) condensing said oil and water from both steps (a) and (b), (d) treating the resulting condensates from step (c) to separate oil from water and any entrained solids, and (f) recovering oil from said treating of step (d).

30. A process according to any of claims 1, 2, 3, 15, 16, 19, 20, 21 or 29 wherein said waste oil sludge is selected from the group consisting of emulsified refinery sludge, bottoms, spills, heat exchanger sludge, secondary emulsions, and slop oil.

31. A process according to any of claims 1, 2, 3, 15, 16, 19, 20, 21, or 29 wherein said heating is conducted in the essential absence of oxygen, and said solids recovered exhibiting more than about 98% volatilization of organic material.

32. A process according to claim 31 wherein said heating is conducted in an atmosphere containing not more than about one percent oxygen.

33. A process according to claim 32 wherein said solids recovered exhibiting more than about 99% volatilization of organic material.

34. A process according to claim 4 wherein said heating is conducted in the essential absence of oxygen, and said solids recovered exhibiting more than about 98% volatilization of organic material.

35. A process according to claim 34 wherein said heating is conducted in an atmosphere containing not more than about one percent oxygen and said solids recovered exhibiting more than about 99% volatilization of organic material.

36. A process for the recovery of oil, useful for further processing as refinery feed stock, from waste oil sludge containing oil, water and at least 5% by weight solids, and from which the oil and water cannot be separated by mechanical means, comprising:

(a) heating by indirect heat exchange said sludge in the essential absence of oxygen at a temperature ranging from about 225° F. to 1150° F. to volatilize the oil and water in said sludge, and recovering solids exhibiting more than about 98% volatilization of organic material, said solids being classified nonhazardous by EPA toxicity test procedure; (b) condensing said oil and water; (c) separating oil from water and entrained solids from the condensate from step (b); (d) recovering oil from step (c) as a valuable oil product; and (e) recovering the water, whereby said water is sufficiently clean for further treatment in a conventional water treatment facility to lower the Chemical Oxygen Demand to an acceptable limit.

37. A process according to claim 1 or claim 36 wherein said valuable oil product recovered from step (c) is for further refinery processing.

* * * * *

(12) EX PARTE REEXAMINATION CERTIFICATE (5549th)
United States Patent
Reynolds et al.

(10) Number: US 5,269,906 C1
(45) Certificate Issued: Oct. 10, 2006

(54) PROCESS FOR THE RECOVERY OF OIL FROM WASTE OIL SLUDGES

(76) Inventors: Victor R. Reynolds, Tobacco Rd., Compton, MD (US) 20627; Steven R. Heuer, 6864 Welch Ct., Arvada, CO (US) 80004

Reexamination Request:
No. 90/007,148, Jul. 30, 2004

Reexamination Certificate for:
Patent No.: 5,269,906
Issued: Dec. 14, 1993
Appl. No.: 07/612,000
Filed: Nov. 13, 1990

Related U.S. Application Data

(63) Continuation-in-part of application No. 07/313,240, filed on Feb. 21, 1989, now Pat. No. 4,990,237, which is a continuation-in-part of application No. 07/077,888, filed on Jul. 27, 1987, now abandoned.

(51) Int. Cl.
*C10G 17/00* (2006.01)

(52) U.S. Cl. .................. 208/13; 208/179; 208/186; 210/770; 210/774; 210/787; 210/806

(58) Field of Classification Search ................ None
See application file for complete search history.

(56) References Cited

U.S. PATENT DOCUMENTS

| | | | |
|---|---|---|---|
| 1,257,515 A | 2/1918 | Miller | 208/179 |
| 1,283,343 A | 10/1918 | Snyder | 208/179 |
| 1,951,739 A | 3/1934 | Rodman | |
| 3,791,965 A | 2/1974 | Fitzsimons et al. | 208/179 |
| 3,923,643 A | 12/1975 | Lewis et al. | 208/184 |
| 4,014,780 A | 3/1977 | McCoy | |
| 4,140,478 A | 2/1979 | Kawakami | |
| 4,179,263 A | 12/1979 | Jung | |
| 4,222,988 A | 9/1980 | Barthel | |
| 4,246,093 A | 1/1981 | Wolcott, Jr. | |
| 4,260,473 A | 4/1981 | Bauer | |
| 4,277,316 A | 7/1981 | Taylor | |
| 4,289,578 A | 9/1981 | Greenfield et al. | 208/187 |
| 4,342,645 A | 8/1982 | Fletcher et al. | 208/184 |
| 4,439,209 A | 3/1984 | Wilwerding | |
| 4,701,219 A | 10/1987 | Bonee | |
| 4,747,961 A | 5/1988 | Beer | |
| 4,787,323 A | 11/1988 | Beer | |
| 4,794,871 A | 1/1989 | Schmidt | |
| 4,839,022 A | 6/1989 | Skinner | |
| 4,864,942 A | 9/1989 | Fochtman | |
| 4,872,949 A | 10/1989 | Wilwerding | |
| 4,913,245 A | 4/1990 | Skinner | |
| 4,990,237 A | 2/1991 | Heuer | |

FOREIGN PATENT DOCUMENTS

| | | |
|---|---|---|
| EP | 0 184 411 | 6/1986 |
| EP | 0 224 353 | 6/1987 |

OTHER PUBLICATIONS

API Interim Report, "Evaluation of Treatment Technologies for Listed Petroleum Refinery Wastes", Jun. 1987.

*Primary Examiner*—Jerry D. Johnson

(57) ABSTRACT

Commercially valuable oil is recovered from refinery-produced, Resource Conservation and Recovery Act classified, hazardous waste oil sludges by a series of volatilizing and condensing steps (which may vary depending on the oil, water, and solids content of the sludge) resulting in the production of nonhazardous water and solid waste byproducts. A pumpable, low viscosity, high oil- and/or water-content sludge is first centrifuged to separate free oil and water. If the waste sludges are acidic or if nickel is present in the sludges in sufficient quantities so as to result in unacceptable levels in the TCLP leach filtrate, a base (such as calcium oxide) is admixed with the thick waste oil sludge, centrifuge solids, or other sludges low in oil and/or water content to render the sludges basic. The basic, admixed sludges are heated to volatilize the contained water and oil. Dry, friable, deoiled solids are recycled with the oily sludge feed to prevent material agglomeration and heat exchanger fouling. Oil and water vapor from the high-temperature volatilization apparatus is recycled as an indirect heat source to the low-temperature volatilization apparatus. The volatilized oil and water are condensed and combined with the oil and water centrate, and the oil and water are essentially separated as by gravity. The oil is separated from any entrained water and solids. The nearly oil free, nonhazardous waste water and nonhazardous, deoiled solids can be disposed of in a conventional manner, and the commercially valuable recovered oil is suitable for further refinery processing.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–37 is confirmed.

* * * * *